INVENTORS
Clarence O. Glasgow
James O. Brown
BY
Arthur L. Wade
ATTORNEY

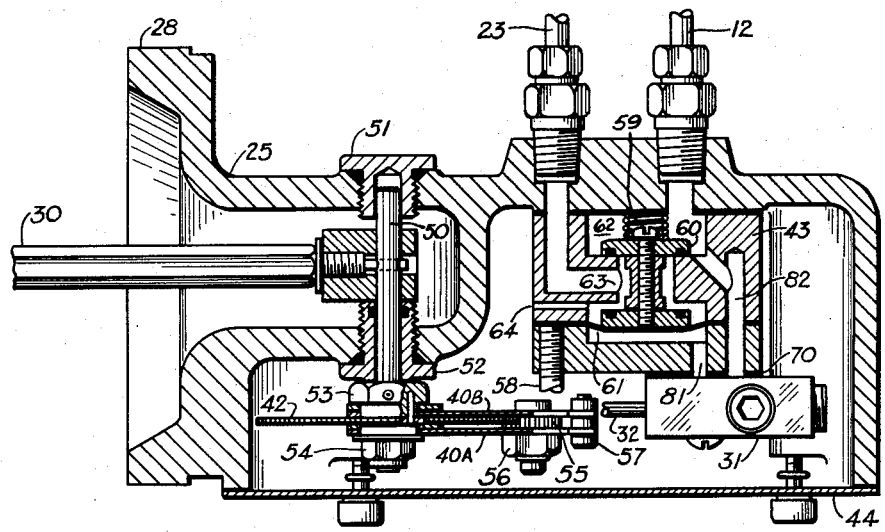
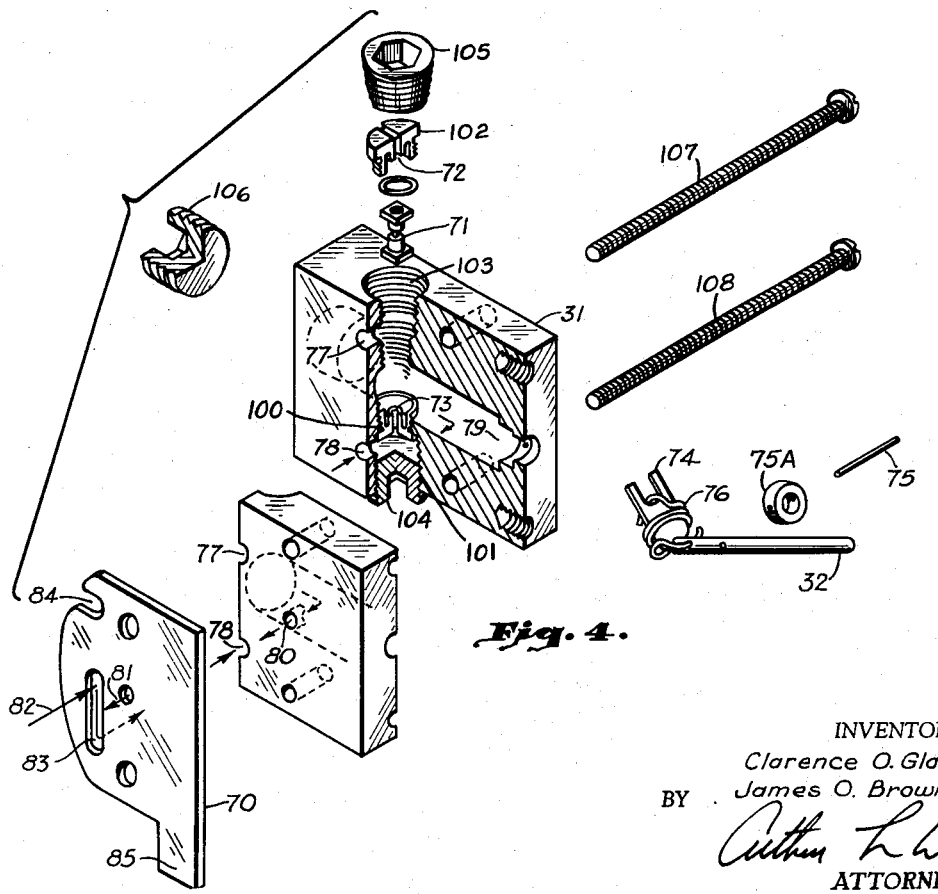

2,944,562

FLUID PRESSURE CONTROL SYSTEM

Clarence O. Glasgow and James O. Brown, Tulsa, Okla., assignors to National Tank Company, Tulsa, Okla., a corporation of Nevada Filed June 17, 1958, Ser. No. 742,569

7 Claims. (Cl. 137—270)

The present invention relates to a system employing a fluid pressure to exhibit and/or control a variable. More particularly, the invention is embodied in structure of the system with which the relation of the direction of primary element movement to the development of the impulse exhibiting and/or controlling the variable is indicated and converted.

The use of power developed by the mechanical movement of primary elements is well known. Further, the use of a float, as a primary element, on the variable level of a liquid to develop power is common. A wide variety of systems have utilized this float power to exhibit the height of the level to which the float responds and to control the level to a predetermined height.

A storage tank for water is one of many places where a float may be used to exhibit and control liquid level through a system actuated by the float.

The fluid pressure power of the systems may be developed from any of a wide variety of gases under pressure. If available, compressed air is preferable because it is clean, cheap and non-combustible. Aside from a consideration of this source of power, it is desirable that fluid pressure systems responding to float movement have simplicity and ruggedness compatible with the desired degree of accuracy and sensitivity.

The present invention is embodied in a system, considered from its float responding to a variable liquid level, through a valve regulating liquid causing the float to vary in position. The system develops a power impulse from fluid pressure in accordance with float movement. The float moves in the two directions of level variation. As the float moves up, the power impulse is developed, or is caused to decay. As the float moves down, the power impulse either decays or is developed. A problem exists in providing the system with a ready means for reversing the relationship between the float movement and power impulse development and decay in order to predetermine the direction of application of the power impulse which will move a regulating device for the variable in the desired direction. The regulating device, usually a valve of some sort, may be limited by its construction to the direction a power impulse may be applied to it. To have complete flexibility, it would then be necessary to have it possible to reverse the relationship between float movement and impulse development to select the direction of valve movement which will give the desired control action. Further, there is the problem in providing a predetermined overlap in the range of float movement up and float movement down, which ranges contain the points at which development and decay of the power impulse is made to occur.

A principal object of the present invention is to provide convenient adjustment of the points in space where a primary element positioned by a variable causes a power impulse to develop and decay.

Another object is to provide for readily reversing the relationship between the direction of primary element movement and the development and decay of the power mpulse into which the movement is transduced.

Another object is to eliminate separate conduit structure between components of a fluid pressure control system.

Another object is to provide a ready means of indicating the relationship between the direction of primary element movement and the development and decay of a transduced power impulse magnitude.

Another object is to relay the power impulse developed by a fluid pressure control system in response to a primary element movement in combination with a ready adjustment of the point in the movement of the primary element at which a change takes place in the magnitude of the power impulse and in combination with a provision for reversing the relationship between the direction of primary element movement and development and decay of the power impulse into which the movement is transduced.

The present invention contemplates the use of a primary element, such as a float, mechanically linked to a rotary member. Actuating arms are adjustably clamped to the rotary member. A fluid pressure pilot valve is actuated by being contacted with the arms at predetermined points in their rotation. A fluid pressure relay is clamped to the pilot valve and develops a fluid pressure impulse with which a regulating valve adjusts the level sensed by the float.

The invention further contemplates the provision of an arrangement between the ports of the pilot valve and the ports of the relay which can be readily altered by shifting the position of the gasket between the ports. In one position, the gasket establishes a first relation between the direction of float movement and the magnitude of the relay output and the alternate, second, position of the gasket reverses the relation.

The invention further contemplates a gear and pinion structure between the rotary member and its actuating arms. The gear and pinion structure provides a convenient means whereby the actuating arms are clamped to the rotary means predetermined distances apart so as to come into contact with, and actuate, the pilot valve at predetermined points in the path of float movement.

Other objects, advantages and features of this invention will become apparent to one skilled in the art upon consideration of the written specification, appended claims, and attached drawings wherein;

Fig. 3 is a sectioned elevation of the structure of Fig. 2 along the lines 3—3; and Fig. 4 is an exploded isometric view, partially in section, of structure associated with the pilot valve of the control system.

*The general system*

Figures 1, 2:
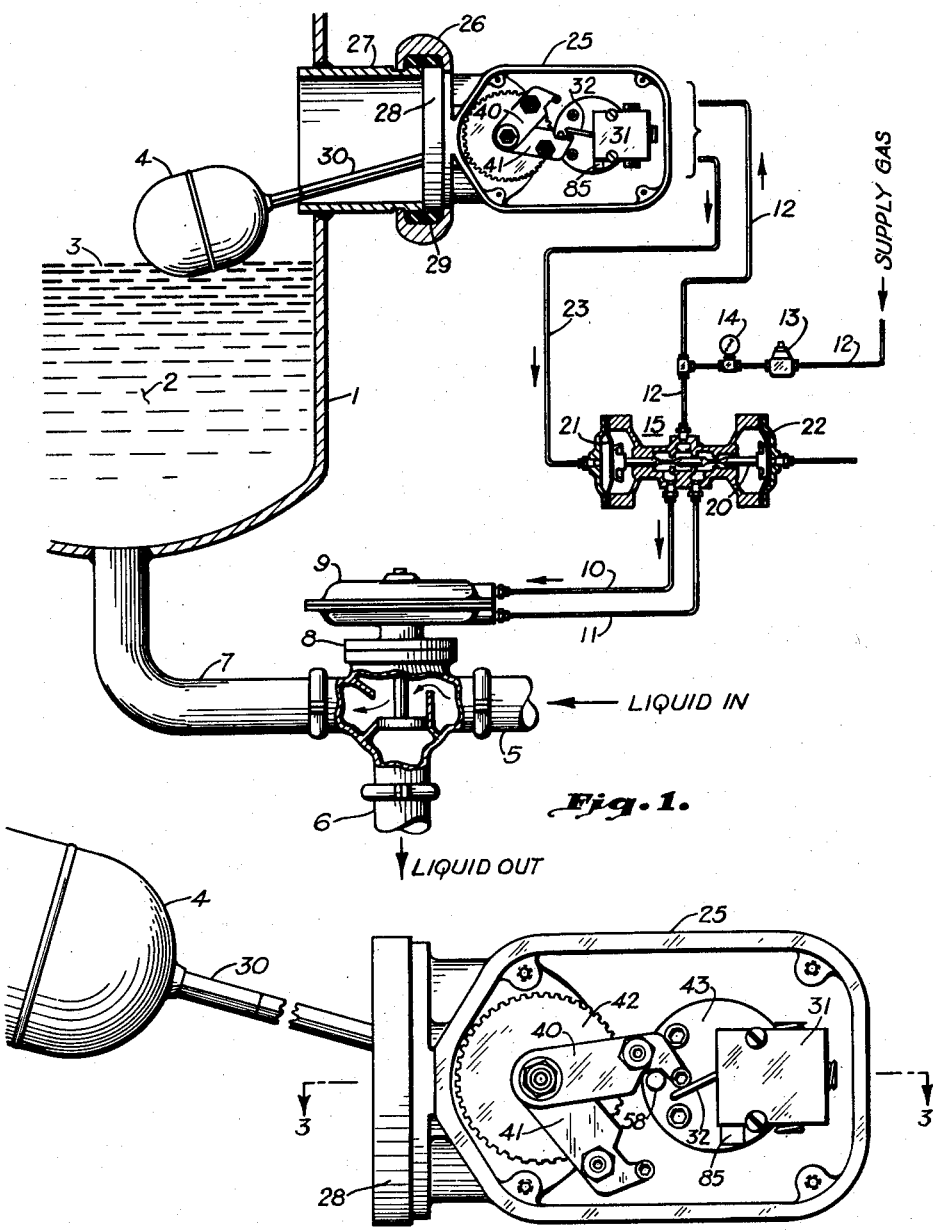
Fig. 1 illustrates a portion of a level control system embodying the present invention.
Fig. 2 illustrates a part of the control system illustrated in Fig. 1 on a somewhat larger scale.

Fig. 1 has been used to illustrate the system in which the invention is embodied associated with a tank 1 in which a body of liquid 2 is accumulated to a level 3. Level 3 represents the many variables which the system can exhibit and/or control. The primary element of this system is illustrated as embodied in float 4, floating on the surface of liquid body 2 in sensing the variable height of level 3.

The mechanical motion of float 4, as an element positioned in space by variable level 3, is transduced into a power impulse input into the control system. The power impulse developed may be utilized to exhibit the elevation of level 3, or it may be used to regulate a supply of liquid to maintain the level 3 at a desired minimum height.

Regulation of liquid to tank 1 is illustrated as obtained with a valve in a conduit from a supply of liquid. The liquid is brought to tank 1 through conduit 5 and is discharged from tank 1 through conduit 6. Conduit 7 is common to both supply and discharge of the liquid as regulated by three-way valve 8.

Valve 8 has two positions with which it alternates the supply of conduit 5 and the discharge of conduit 6 into communication with conduit 7. Valve 8 is shown as positioned by a diaphragm operator within a housing 9. Power impulses, in the form of fluid pressures, are applied to the diaphragm of housing 9. When the power of fluid pressures are alternately applied to valve 8, the valve 8 is shifted from one of its positions to the other. A supply of fluid pressure, preferably compressed air, is brought into the system, for conduits 10 and 11, by conduit 12.

A specific source of fluid pressure for conduit 12 is not shown. If only a relatively high pressure fluid is available, a regulator 13 can be used to reduce the supply pressure to a suitable value as indicated on gauge 14. Whatever the source of fluid pressure made available to conduit 12, it is alternately applied to conduits 10 and 11 by means of valve 15.

Valve 15

Valve 15 functions to alternately communicate the supply pressure of conduit 12 to conduit 10 and conduit 11. This communication is accomplished by shuttling valve stem 20 alternately to the right and left, as viewed in Fig. 1.

Valve stem 20 is shuttled between these two positions by the force developed on diaphragms 21 and 22 with the fluid pressure of conduit 12. In the position illustrated, diaphragm 21 has a force developed upon it, from the fluid pressure of conduit 12, which has shifted the valve stem 20 to the right. Valve stem 20, in this position, connects the supply of conduit 12 to conduit 10. The diaphragm of valve 8 is forced downwardly and the liquid supply of conduit 5 is communicated with conduit 7 to raise the height of level 3.

There are no springs applying forces to valve stem 20. Therefore, once the force developed on diaphragm 21 has shifted valve stem 20 to the right, decay of this force will not cause the position of valve stem 20 to change. When a power impulse is subsequently developed on diaphragm 22, valve stem 20 will be shuttled to the left and connect the supply of conduit 12 to conduit 11. The result is a lifting of the diaphragm of valve 8 and discharge of liquid from tank 1.

A control system for development of a fluid pressure power impulse on diaphragm 22 is not illustrated. However, such system could be similar to that illustrated as developing the fluid pressure power impulse for diaphragm 21 in conduit 23. The present invention is embodied in this system for developing the conduit 23 impulse as a transduction of the movement of float 4. Housing 25 contains the various structures of this embodiment of the control system which prevents the level 3 from decreasing below the value illustrated. Once level 3 is exceeded because of the flow into the tank 1 through conduit 5, and the impulse in conduit 23 is decayed to the atmospheric value, another system (not shown) can be made available to respond to the level, or some other factor, to develop the fluid pressure on diaphragm 22 which will shift valve 15 and connect conduits 6 and 7.

Housing 25

Housing 25 is viewed from the same direction in both Fig. 1 and Fig. 2, the scale of Fig. 2 being somewhat the larger of the two. In both views, the cover has been removed from housing 25, the better to illustrate the compact assembly of components within the housing which respond to the mechanical motion of float 4 to produce the conduit 23 impulse.

Fig. 1 illustrates the housing, or case, 25 as it is clamped to a pipe fitting fixed in the wall of tank 1. Grooved coupling 26 is formed of two pieces which bridge between a groove in pipe fitting 27 and flange 28 of housing 25. A gasket 29 seals the juncture spanned by coupling 26. As illustrated in Fig. 1, float 4 rests on surface of liquid body 2 and extends the rod 30 through pipe fitting 27 and into housing 25 to transmit the mechanical motion to the components of the control system.

Float 4 is shown in its lower position in Fig. 1 and in its upper position in Fig. 2. As the float is carried between these two positions, pilot valve 31 is actuated. Specifically, stem 32 of valve 31 is moved between its alternate positions by actuating arms mechanically connected to float rod 30.

Pilot valve 31 is of the snap-acting type. The snap-acting mechanism of this valve is disclosed and claimed in Swatsworth 2,860,660. Fig. 4 illustrates the components of the snap-acting mechanism in which the invention is embodied.

Actuating arms

Float 4 and rod 30 actuate stem 32 through a rotary member and actuating arms attached thereto. Actuating arms 40 and 41 are illustrated in Fig. 2 as clamped to gear wheel 42. Gear wheel 42 is rotated about its axis with the float and rod. Arms 40 and 41 are adjustably attached to wheel 42 so as to extend beyond its periphery far enough to contact stem 32.

Wheel 42 is illustrated as having gear teeth on its periphery which engage pinion gears carried by arms 40 and 41. The arms are rotated to any predetermined position about the axis of the wheel. The pinion gears are then prevented from rotating. Then, as the wheel is rotated by the float and rod, the ends of the arms describe an arc as the arm tips bridge stem 32. The result of this arrangement is to move stem 32 with the arm tips from one position to the other as the toothed wheel 42, to which the arms are attached, is rotated by float 4 following the level between predetermined limits.

Fig. 3

As the stem of the valve 31 is actuated, its alternately developed and decaying output fluid pressure is imposed upon relay 43 to develop the fluid pressure power impulse for conduit 23. Fig. 3 illustrates a structure which accomplishes this result. Fig. 3 utilizes a sectioned elevation along the sight of lines 3—3 in Fig. 2. Float rod 30 is shown connected to float stem 50 to rotate stem 50 about its longitudinal axis. The mechanism within case 25, actuated by stem 50, can be viewed in Fig. 3 with cover 44 positioned on case 25.

Pin 50 is pivoted in guide plug 51 and stem bushing 52. Plug 51 and bushing 52 are mounted in aligned bosses of case 25 and suitably gasketed to both stem 50 and case 25 in order to seal the interior of case 25 from the liquid contents of tank 1.

Gear wheel 42 may now be seen more clearly as mounted on the end of stem 50 which extends into the case 25. Arms 40 and 41 can now be seen in the further detail of actually comprising two arms each with gear wheel 42 sandwiched between them. A complete assembly of gear wheel 42 and arms 40 and 41 is brought together, on stem 50, by gear retainer nut 53 and locking nut 54.

The two halves of actuating arm 40 are shown in Fig. 3 as 40A and 40B. These two halves of actuating arm 40 as arm plates on each side of wheel 42, carry pinion gear 55 whose shaft extends through both 40A and 40B. The complete assembly of pinion gear 55, arms 40A and 40B, and their shaft, are brought together by a jam nut 56.

If nut 56 is loosened, pinion gear 55 will roll about the periphery teeth of wheel 42. When nut 56 is tightened, at any point in its rotation, the spatial relation between wheel 42 and arm 40 is fixed and there is no relative movement. With arm 40 fixed, a spacer assembly 57 is provided at the end extending beyond the periphery of wheel 42 to form the contactor for pilot valve stem 32. A stop screw 58 is arranged transverse the travel of arm 40 to limit the travel of both arms 40 and 41 in the direction of their actuating travel.

As pilot valve 31 is actuated, it alternately imposes the fluid pressure of conduit 12 on relay 43, or vents relay 43 to atmosphere. A gasket, examined more thoroughly in Fig. 4, is arranged between pilot valve 31 and relay 43 for determining which of the two positions of stem 32 will cause the fluid pressure supply to be imposed on relay 43. The position of this gasket, between relay 43 and pilot valve 31, establishes the direction of float rod 30 and float 4 movement which will develop the fluid pressure power impulse of the system in conduit 23.

Relay 43

Relay 43 is also seen to best advantage in the sectioned elevation of Fig. 3. The moving part of this relay 43 is a doubleseating valve member 60 urged in one direction by a spring 59 and actuated against this spring 59 by fluid pressure on the face of diaphragm 61. The arrangement of valve member 60 in chamber 62 is clear. The fluid pressure supply of conduit 12 is placed in chamber 62 and is valved into chamber 63 when diaphragm 61 moves the valve upward, as viewed in Fig. 3.

Movement of valve member 60 upward, from its seat, communicates chambers 62 and 63. Conduit 23 is directly connected with chamber 63, so communication between the two chambers establishes the fluid pressure of conduit 12 in conduit 23.

When valve member 60 is moved downward, to seat in the position illustrated in Fig. 3, chamber 63 is communicated with exhaust port 64. Thus, when the output of pilot valve 31 is imposed on diaphragm 61 to move valve member 60 upward, a fluid pressure output is developed in conduit 23.

Alternately, when pilot valve 31 exhausts the fluid pressure from the face of diaphragm 61, the fluid pressure power impulse in conduit 23 decays. This function of relay 43 and pilot valve 31 is illustrated to further advantage in Fig. 4.

Fig. 4

Fig. 4 utilizes a view of pilot valve 31, and the gasket between the valve and relay 43, which is exploded, partially sectioned and isometric. The body of the gasket is shaped and arranged to perform various functions. Correlation between Figs. 3 and 4 will illustrate these various functions clearly.

Fundamentally, gasket 70 seals the fluid pressure supply of conduit 12 within the passages of relay 43 and pilot valve 31. Secondly, gasket 70 forms conduits between the passages of the relay and pilot valve. One of the passages formed by gasket 70 is arranged within the gasket body in a manner to predetermined which of the alternate positions of the pilot valve stem 32 will cause the fluid pressure of conduit 12 to be pressed to diaphragm 61 of relay 43. Alternate arrangements of gasket 70 between relay 43 and pilot valve 31 change the relation between the positions of valve stem 32 and valve output to relay 43. As a final function, a portion of the gasket material itself is arranged to act as a visual index of the conduit arrangement established between the relay and pilot valve, and therefore which position of the pilot valve stem 32 will cause development of the power impulse in conduit 23.

Pilot valve 31

The body of pilot valve 31 has been illustrated in partial section and with its internal parts exploded. The ultimate objective of moving stem 32 between its two positions is to shift shuttle 71 between seats 72 and 73. Yoke 74 straddles the middle of shuttle 71 and flips the shuttle when stem 32 is pivoted about the axis of pin 75. Packing member 75A is normally arranged about pin 32 between the pin 32 and body passage 79 to seal the body passage from atmosphere. Spring 76 is arranged in tension about yoke 74 and between a point on yoke 74 and pin 32 to develop the sudden reversal of a component of force directed generally transverse to the axis of the bore in body 31 in which the yoke, spring and pin are arranged.

Holes 77 and 78 are drilled in body 31 to communicate with the bores of seats 72 and 73 on the sides of these seats which are away from shuttle 71. With this arrangement, shuttle 71 is moved to alternately connect passages 77 and 78 with the central bore 79. Hole 80, drilled into body 31, is aligned with passage 81 in relay 43, this passage 81 leading to the face of diaphragm 61. With this arrangement, the shifting of shuttle 71 alternately communicates holes 77 and 78 with passage 79 and hole 80. Gasket 70 is arranged between the relay and valve to alternately communicate each of the holes 77 and 78 with the supply of fluid pressure in conduit 12 and atmosphere exhaust. Which of these alternates exist at any one time depends on which side of the gasket is placed against the surface of pilot valve 31.

Gasket 70

Passage 82 of relay 43 is illustrated in Fig. 3 as communicating with slot 83 and gasket 70. Communication is with one end of slot 83, regardless of whether gasket 70 is in the position shown in Fig. 4 or turned over to its reverse position. Slot 83 is sufficiently elongated to form a passage with the sealing surfaces of valve 31 and relay 43 which alternate between communication with hole 78, as shown in Fig. 4, or hole 77, when the gasket is turned over from the position illustrated. At the same time, notch 84 is formed in gasket 70 and arranged to communicate hole 78 with atmosphere or hole 77 with atmosphere, depending upon the position of gasket 70. Gasket 70 has sufficient thickness that slot 83 and notch 84 form passages of adequate capacity with the surfaces of relay 43 and valve 31 to conduct fluid pressures to and from holes 77, 78 and 80 in the alternate positions of gasket 70.

Consider the specific arrangement of Fig. 4. Gasket 70 is positioned to communicate hole 77 with atmosphere through conduit-notch 84. The fluid pressure supply of conduits 12 and 82 are communicated with conduit slot 83 to hole 78. Thus, it is apparent, that when valve stem 32 is positioned to place shuttle 71 against seat 72, communication will be established between the supply of conduits 12 and 82, hole 78, bore 79, passage 81 and the face of diaphragm 61. When valve stem 32 is alternately positioned, relay 43 will have its valve 60 positioned as shown in Fig. 3 and the fluid pressure in conduit 23 will be decayed to the atmospheric value. The alternate, or reverse, position of gasket 70 will reverse the communication of notch-passage 84 and slot 83 with holes 77 and 78. The relation between the position of pin 32 and fluid pressure development on the face of diaphragm 61 will reverse.

Seat 73 is illustrated in Fig. 4 as formed on a body 100 threadedly engaged in passage 101 of the body of valve 31. A similar seat body 102 is shown exploded from passage 103 of the valve body. Plug bodies 104 and 105 in each of passages 101 and 103 seal the seats and holes 77 and 78 from atmosphere. Plug 106 seals one end of passage 79. Screws 107 and 108 pass through mounting holes in the valve body, gasket 70 and relay 43 to bring the combination together in forming the passages between them.

The several functions of gasket 70 can now be summed up. The gasket seals between the surfaces of the pilot valve and the relay. Further, the gasket forms conduits between the body holes of the relay and pilot valve. The gasket becomes a means whereby the fluid pressure output of the valve is directed on to the face of diaphragm 61 of the relay in predetermined correlation with the position of valve stem 32. Finally, the direction of actuation of pin 32 which will develop the output power impulse in conduit 23 is indexed by visual observation of the position of tab 85 of gasket 70. The tab portion 85 of gasket 70 is extended a sufficient distance beyond the junction of the two units to become a visual reference.

From the foregoing it will be seen that this invention is one well adapted to attain all of the ends and objects hereinabove set forth, together with other advantages which are obvious and which are inherent to the apparatus.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A fluid pressure transmitter including, a primary element which is moved in space by a variable, a member mechanically linked to and rotated by the primary element, a valve of the snap-acting type which is actuated between alternate positions by the rotated member and develops a fluid pressure output when actuated to a first of the alternate positions and effects the dissipation of said developed pressure output when actuated to a second of said alternate positions, a fluid pressure relay clamped to the valve and arranged to respond to the valve output fluid pressure to develop a power output fluid pressure when the valve is actuated to one of the positions and effects the dissipation of said developed power output when actuated to the other of the positions, and means between the valve and relay to predetermine which of the alternate positions of the valve will develop the power output fluid pressure.

2. The fluid pressure transmitter of claim 1 in which, the means predetermining the position of the snap-acting valve which will develop the power output fluid pressure is a gasket which is shifted in position between the valve and relay to alternate between two ways of connecting passages of the valve and relay together.

3. The fluid pressure transmitter of claim 2, including, actuating arms adjustably attached to the rotated member and arranged to mechanically actuate the snap-acting valve at predetermined points in the range of member rotation, and in which, the primary element is a float moved vertically by a liquid level as the variable.

4. The fluid pressure transmitter of claim 3 in which, the actuating arms are pivoted from the center of rotation of the member rotated by the float and the adjustable attachment includes pinion wheels fastened to the arms meshing with teeth formed in an arc on the member about the center of rotation.

5. The fluid pressure transmitter of claim 4 in which, the actuating arms are formed of two arms sandwiching the rotated member and pivoting one of the pinion gears between them in an arrangement whereby the arms and gear can be clamped together at any predetermined point of pinion gear rotation.

6. The fluid pressure transmitter of claim 5 in which, a common fluid pressure supply is arranged to supply both the snap-acting valve and the fluid pressure relay, and the gasket is provided with a form with which a hole in the gasket will direct the common fluid pressure supply to alternate input holes of the valve and a notch in the gasket will vent to atmosphere the input hole of the valve which is not supplied from the common fluid pressure supply while the gasket acts as a mounting pad for the valve on the relay.

7. The fluid pressure transmitter of claim 6 in which, the gasket is sized at a portion of its periphery to extend beyond the junction of the relay and valve to form a visual index of its positional relation to the relay and valve passage connection, whereby it becomes evident which of the alternate positions of the valve will develop the power output fluid pressure.

References Cited in the file of this patent

UNITED STATES PATENTS

| | | |
|---|---|---|
| 529,739 | Long | Nov. 27, 1894 |
| 1,085,166 | Sanborn | Jan. 27, 1914 |
| 1,752,631 | Campbell | Apr. 1, 1930 |
| 2,186,224 | Wolfert | Jan. 9, 1940 |
| 2,191,700 | Stetson | Feb. 27, 1940 |
| 2,339,469 | Emanuel | Jan. 18, 1944 |
| 2,817,241 | Chandler | Dec. 24, 1957 |
| 2,842,157 | Mosher | July 8, 1958 |